United States Patent
Cohen et al.

(10) Patent No.: US 10,754,851 B2
(45) Date of Patent: Aug. 25, 2020

(54) QUESTION ANSWERING FOR DATA VISUALIZATIONS

(71) Applicant: Adobe Inc., San Jose, CA (US)

(72) Inventors: Scott Cohen, Sunnyvale, CA (US); Kushal Kafle, Kathmandu (NP); Brian Price, San Jose, CA (US)

(73) Assignee: ADOBE INC., San Jose, CA (US)

( * ) Notice: Subject to any disclaimer, the term of this patent is extended or adjusted under 35 U.S.C. 154(b) by 214 days.

(21) Appl. No.: 15/852,506

(22) Filed: Dec. 22, 2017

(65) Prior Publication Data

US 2019/0197154 A1 Jun. 27, 2019

(51) Int. Cl.

| G06F 16/30 | (2019.01) |
|---|---|
| G06F 16/242 | (2019.01) |
| G06T 11/20 | (2006.01) |
| G06K 9/18 | (2006.01) |
| G06N 3/02 | (2006.01) |
| G06F 16/26 | (2019.01) |
| G06F 16/248 | (2019.01) |
| G06F 16/2457 | (2019.01) |
| G06N 3/04 | (2006.01) |
| G06N 3/08 | (2006.01) |
| G06N 5/04 | (2006.01) |

(52) U.S. Cl.
CPC .......... *G06F 16/243* (2019.01); *G06F 16/248* (2019.01); *G06F 16/24578* (2019.01); *G06F 16/26* (2019.01); *G06K 9/18* (2013.01); *G06N 3/02* (2013.01); *G06N 3/0427* (2013.01); *G06N 3/0445* (2013.01); *G06N 3/0454* (2013.01); *G06N 3/08* (2013.01); *G06T 11/206* (2013.01); *G06N 5/041* (2013.01)

(58) Field of Classification Search
CPC .............................. G06F 16/243; G06F 16/26
See application file for complete search history.

(56) References Cited

U.S. PATENT DOCUMENTS

2015/0356135 A1\* 12/2015 Sanchez ................ G06F 16/243
707/763

OTHER PUBLICATIONS

Article entitled "FigureQA: An Annotated Figure Dataset for Visual Reasoning", by Kahou et al., dated Oct. 19, 2017.\*
Article entitled "FigureSeer: Parsing Result-Figures in Research Papers", by Siegel et al., dated 2016.\*
Article entitled "Show, Ask, Attend, and Answer: A Strong Baseline for Visual Question Answering", by Kazemi et al., dated Apr. 12, 2017.\*
Article entitled "Answer-Type Prediction for Visual Question Answering", by Kafle et al., dated Jun. 2016.\*
Article entitled "Answering Questions about Data Visualizations using Efficient Bimodal Fusion", by Kafle et al., dated Aug. 5, 2019.\*

(Continued)

*Primary Examiner* — Mahesh H Dwivedi

(57) ABSTRACT

Systems and techniques are described that provide for question answering using data visualizations, such as bar graphs. Such data visualizations are often generated from collected data, and provided within image files that illustrate the underlying data and relationships between data elements. The described techniques analyze a query and a related data visualization, and identify one or more spatial regions within the data visualization in which an answer to the query may be found.

16 Claims, 9 Drawing Sheets

(56) References Cited

OTHER PUBLICATIONS

Article entitled "DVQA: Understanding Data Visualizations via Question Answering", by Kafle et al., dated 2018.*
Futrelle, Robert, et al., "Extraction, layout analysis and classification of diagrams in PDF documents", Seventh International Conference on Document Analysis and Recognition, 2003, 7 pages.
Kembhavi, A., et al., "A diagram is worth a dozen images", arXiv:1603.07396v1, Mar. 24, 2016, 17 pages.

* cited by examiner

QUESTION ANSWERING FOR DATA VISUALIZATIONS

TECHNICAL FIELD

This description relates to question answering for data visualizations.

BACKGROUND

It is often desirable to represent information using visualizations of data, such as bar graphs, pie charts, and various other forms of visualizations. Such data visualizations are advantageously capable of conveying large amounts, and varied types, of information, in forms that are compact and convenient. Moreover, such data visualizations are versatile enough to illustrate information for audiences ranging from elementary school students to advanced, specialized users in virtually any field of endeavor.

Although data visualizations were designed specifically to convey large amounts of underlying data in a manner that is visually observable to human readers, conventional computer search techniques are often largely or completely incapable of accessing or utilizing the underlying data. For example, it is typical for document files to include a data visualization as an image file; e.g., embedded within a larger document file. Many techniques exist for searching the text within such document files, but the image file displaying the data visualization will be ignored by such techniques.

Consequently, for example, a user may submit a query to be applied across a plurality of documents for desired information using conventional techniques, and the query will not be satisfied if the desired information is included in a data visualization contained in one or more of the searched documents. Similarly, a user's search within a single document may be unsuccessful if the desired information is included within a data visualization. As a result, in these and similar scenarios, such users may be unable to benefit from the desired information, even though the desired information is included within the available document(s).

SUMMARY

According to one general aspect, a computer program product is tangibly embodied on a non-transitory computer-readable storage medium and includes instructions. The instructions, when executed by at least one computing device, are configured to cause the at least one computing device to identify a data visualization (DV), and generate a DV feature map characterizing the data visualization, including maintaining a correspondence of spatial relationships of mapped features of the data visualization within the DV feature map with corresponding features of the data visualization. The instructions are further configured to cause the at least one computing device to identify a query for an answer included within the data visualization, encode the query as a query feature vector, generate a prediction of at least one answer location within the data visualization, based on the DV feature map and the query feature vector; and determine the answer from the at least one answer location.

According to another general aspect, a computer-implemented method includes receiving a query for a data visualization (DV), encoding the query as a query feature vector, and generating a DV feature map characterizing at least one spatial region of the data visualization. The computer-implemented method further includes generating a prediction of at least one answer location within the at least one spatial region, based on a combination of the at least one spatial region of the data visualization and the query feature vector, and determining an answer to the query from the at least one answer location.

According to another general aspect, a system includes at least one memory including instructions, and at least one processor that is operably coupled to the at least one memory and that is arranged and configured to execute instructions. The instructions, when executed, cause the at least one processor to generate a visualization training dataset that includes a plurality of training data visualizations and visualization parameters, and query/answer pairs for the plurality of training data visualizations, and train a feature map generator to generate a feature map of each of the training data visualizations. The instructions, when executed, are further configured to train a query feature vector generator to generate a query feature vector of each of the queries of the query/answer pairs, and train an answer location generator to generate an answer location within each of the training data visualizations of an answer for a corresponding query of the query/answer pairs, based on outputs of the trained feature map generator and the trained query feature vector. The instructions, when executed, are further configured to input a new data visualization and a new query into the trained feature map generator and the trained query feature vector to obtain a new feature map and a new query feature vector, and generate a new answer location within the new data visualization for the new query, based on the new feature map and the new query feature vector.

The details of one or more implementations are set forth in the accompanying drawings and the description below. Other features will be apparent from the description and drawings, and from the claims.

DETAILED DESCRIPTION

Figure 1:
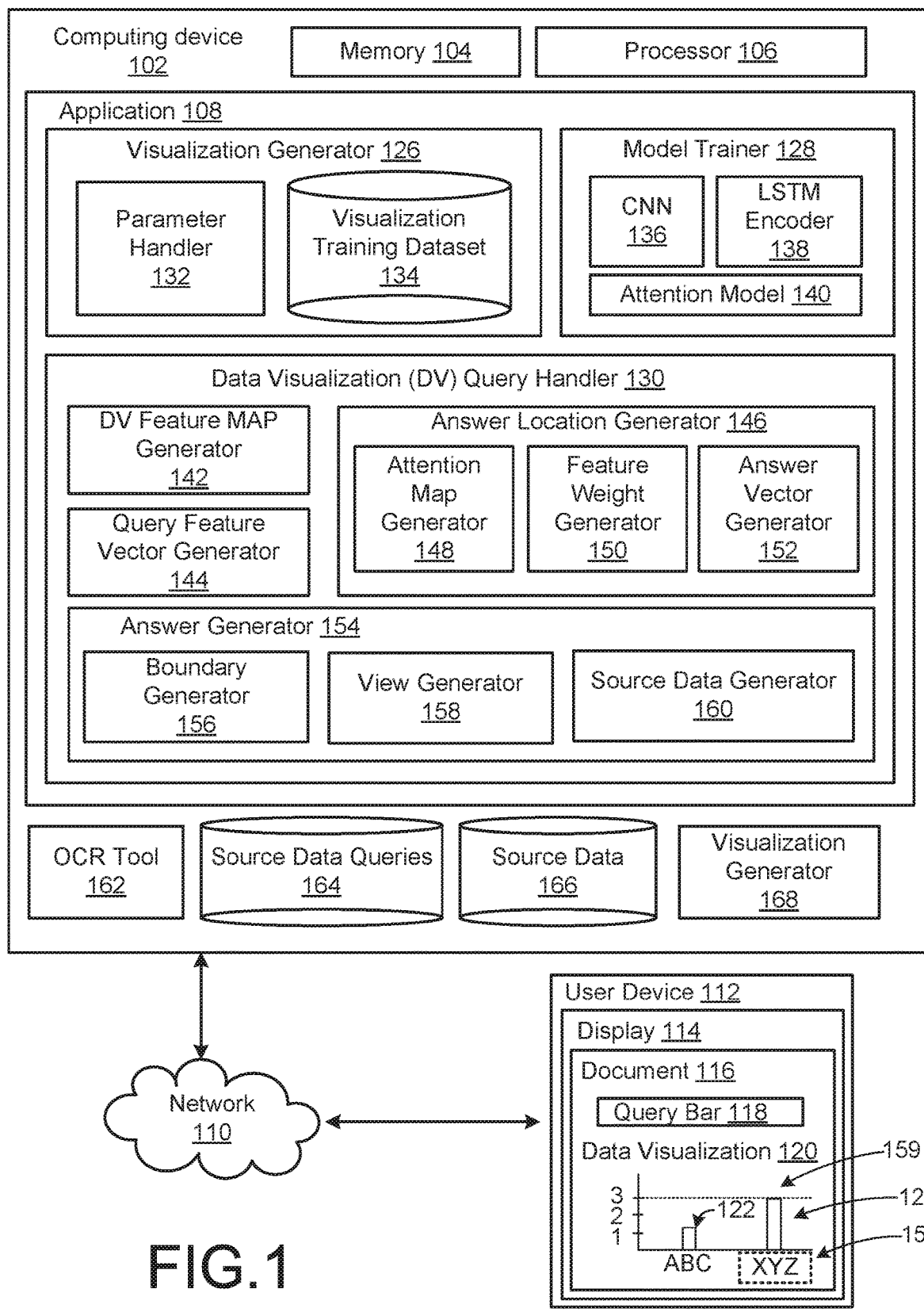
FIG. 1 is a block diagram of a system for question answering for data visualizations.

This document describes systems and techniques that provide for question answering using data visualizations. Such systems and techniques overcome technical challenges of previous systems and techniques, and improve the process(es) to perform related automated processing. For example, from within an application, a query may be submitted and a search may be performed with respect to the content of data visualizations included within an identified document(s), instead of performing only text searches within or across the document(s) (e.g., string-based or semantic matching of document terms with query terms). The described data visualization search techniques utilize a more efficient, faster, more accurate and more complete algorithm(s) than other algorithms that attempt to search any data visualization(s). Moreover, the data visualization search techniques provide for the new computer functionality of, e.g., requesting and finding data contained within (represented by) a data visualization, even when the data visualization is an image file that includes only pixel values encoding the image of the data visualization, and for returning search results identified in conjunction with processing of the data visualization with respect to at least one query.

The systems and techniques provide a user interface within the application to enable users to submit a query, including a large variety of the types of queries that human users typically consider when viewing and interpreting a data visualization. For example, such queries may include structural questions regarding a structure of the data visualization(s) (such as how many bars are included in a bar graph), value questions (such as a specific value of a specific bar within a bar graph), comparative questions (such as which bar is largest or smallest within a bar graph), and label questions (such as identifying and reading content of a label or other identifier of a specific bar of a bar graph).

For example, a user may provide a spoken query, e.g., "which South American country has the highest GDP?". The query may be provided with respect to a specific document, or with respect to a collection of documents, or to any search engine tasked with searching through a defined search space. The query need not be directed to any particular data visualization, or type of data visualization, and, in fact, the user submitting the query may not be aware that a (relevant) data visualization even exists within the search space. Nonetheless, the user may be provided with the desired answer, because the present techniques enable the finding, analysing, and interpreting of information that is implicit within data visualizations, but not available to current search techniques. As a result, the described techniques are capable of providing users with information that might otherwise be found by, or available to, those users.

Example user interfaces may thus be operable to generate and visually display desired answers, either independently of, or in conjunction with (e.g., overlaid upon), the queried data visualization itself. In other examples, the described systems and techniques are operable to capture the data underlying the data visualization(s), and thereafter re-render the same or different data visualization in an editable format.

As described in detail below, example techniques include the use of various types of machine learning and associated algorithms and models, in which a synthetic dataset is generated for the type of data visualization to be searched, including synthetic queries and answers. The synthetic dataset is then used as a training dataset to train a plurality of models and algorithms.

For example, a model such as a convolutional neural network may be trained to generate a feature map of a data visualization, and a long short term memory (LSTM) network may be used to encode a query as a feature vector. Then, an attention-based model and associated techniques may be used to combine the feature map and the query feature vector, such as by generating a visualization feature vector from the feature map, and then concatenating the visualization feature vector and the query feature vector.

In this way, or using additional or alternative techniques, it is possible to predict where, within the image of the data visualization(s), a desired answer is located. Then, one or more techniques may be used to determine the answer from the predicted or identified answer location. For example, optical character recognition (OCR) may be used. In other examples, additional machine learning models and algorithms may be used to provide an end-to-end solution for reading identified answers from a data visualization, e.g., character-by-character.

In other example implementations, the described systems and techniques may be used to examine a data visualization and recover all data, or all desired data, that was used to generate the examined data visualization, e.g., the underlying source data of the data visualization. For example, by using the query/answer techniques described herein, it is possible to utilize a set of queries to systematically identify the source data. Then, the source data may be used for any desired purpose, including rendering the source data as a different (type of) data visualization. For example, a bar graph may be analysed to determine underlying source data, and then graphing software may be used to re-render the source data as a pie graph, or other type of data visualization.

Thus, for example, the systems and techniques described in this document help to search across a corpus of documents or other files that contain data visualizations, to find information that would otherwise be lost to the user performing the search. Further, it is possible to provide intelligent document-based software, which can provide documents for viewing, editing, and sharing, including finding and interpreting information for readers of the document(s) that might otherwise be missed or misinterpreted by those readers.

Additionally, the systems and techniques described herein advantageously improve existing technology areas. For example, as described, computer-based searching is improved, e.g., by providing for computer-based searching of/for data visualizations and data included therein. Further, the systems and techniques may be used for a more automated and more efficient and faster approach to interpreting data visualizations.

In particular, for example, the described techniques do not rely on classifying the actual content of either data visualizations used for training, or data visualizations being searched. For example, it is not necessary for the described techniques to classify one of two or more known answers to pre-designated queries, e.g., as either "yes" or "no" answers to questions such as, "is the blue bar the largest bar in the bar graph?" Instead, the described techniques are able to find answers, or information needed to determine answers, within spatial location(s) of the image of the data visualization itself, including first considering an entire area of the data visualization being considered. Therefore, the described techniques can answer newly-received queries, even when such a query (or associated answer) was not seen before during the context of training operations. For example, although training data could include actual bar graphs (i.e., "real world" bar graphs representing actual data), or other data visualizations if desired, the training set also may include nonsense words and/or random content. As a result, it is straightforward to generate training datasets of desired types, without needing to create or compile existing, actual data visualizations.

FIG. 1 is a block diagram of a system 100 for question answering using data visualizations. The system 100 includes a computing device 102 having at least one memory 104, at least one processor 106 and at least one application 108. The computing device 102 may communicate with one or more other computing devices over a network 110. For instance, the computing device 102 may communicate with a search server 111 over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network. In many of the following examples, the computing device 102 is described as, or may be understood to represent, a server.

The at least one processor 106 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The network 110 may be implemented as the Internet, but may assume other, different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102, at the computing device 102. In other implementations, the application 108 may be running on the computing device 102 as a component of a cloud network where a user accesses the application 108 from another computing device (e.g., user device 112) over a network, such as the network 110. In one implementation, the application 108 may be a document creation or viewer application. In other implementations, the application 108 may be a stand-alone application that is designed to work with a document creation or viewer application (e.g., running on the user device 112). The application 108 also may be a standalone application that is used to search a plurality of documents created by a document creation or viewer application(s). In still other alternatives, the application 108 may be an application that runs, at least partially, in another application, such as a browser application. Of course, the application 108 may be a combination of any of the above examples, as well.

In the example of FIG. 1, the user device 112 is illustrated as including a display 114 in which a document 116 is rendered. As referenced above, the document 116 may be provided by a document reader application, which may include at least a portion of the application 108, or which may leverage an ability of the application 108 to benefit from the various visualization search techniques described herein.

Specifically, the document 116 is illustrated as including a query bar 118, in which a user may submit one or more queries related to one or more data visualizations, represented in the simplified example of FIG. 1 by a single data visualization 120. For example, in the context in which the document 116 is a single, potentially large or lengthy document that is being reviewed by a user, the query bar 118 may be provided so that the user may submit one or more questions, requests, or other queries with respect to content of the document 116. In these and similar examples, such a lengthy document may include a potentially large number of data visualizations, and the user may be unaware of a location or existence of the data visualization 120 that contains desired information within the context of the larger document 116.

Consequently, using the various techniques described herein, the user may nonetheless submit a query for desired information by way of the query bar 118, and may be provided with an identification of the data visualization 120 as including the desired information, as well as the specific, requested information. Various techniques for providing the requested information are illustrated and described herein, or would be apparent to one of skill in the art.

Further, it would be appreciated that the techniques described herein may be applied across a plurality of documents or other types of content including data visualizations. For example, the query bar 118 may be implemented as a standard search bar within a search application configured to search across a plurality of documents or other files. In such context, the user of the search application may thus be provided with, e.g., an identified document and included data visualization, such as the data visualization 120, to thereby satisfy the search request of the user.

By way of non-limiting terminology, then, it will be appreciated that the term query should be understood to include, and may be used interchangeably with, any question, request, search, or other attempt to locate desired answers, search results, data, or other information. Any such information may be included within any suitable type of digital content, including, as referenced above, documents, articles, textbooks, or any other type of text file that is capable of including and displaying images. Of course, such digital content also may include individual image files that include one or more images of one or more data visualizations, such as the data visualization 120. Thus, such digital content may be included within individual files having any suitable format, such as, e.g., .pdf, .doc, .xls, .gif, or .jpeg file formats. Still further, such data visualizations could be included within video files, and the search techniques described herein may be applied against individual frames of such video files containing data visualizations, such as the data visualization 120.

In the example of FIG. 1, the data visualization 120 is illustrated as a simplified bar graph in which a first bar 122 has a label "ABC," while a second bar 124 has a label "XYZ." Of course, again, it will be appreciated that the simplified data visualization 120 of FIG. 1 should be understood to represent a non-limiting example of the many different types of data visualizations that may be utilized in the context of the system 100 of FIG. 1.

For example, many different types of bar graphs may be utilized, some examples of which are illustrated below with respect to FIGS. 6-8. Further, other types of data visualizations, such as pie charts, scatter plots, networks, stream graphs, tree maps, Gant charts, heat maps, and many other types of visual representations of data may be used. Thus, the data visualization 120 of FIG. 1, and other data visualizations described herein, should be generally understood to represent any suitable technique of encoding numerical data using dots, lines, bars, segments, or any other combination of visual elements and associated numerical values, together with suitable labels for the elements and values, which, taken together, communicate underlying information in an illustrated, schematic format.

As referenced above and described in detail herein, the system 100 enables the user of the user device 112 to submit queries and receive answers regarding the data visualizations represented by the data visualization 120. For example, such queries may include structural queries (e.g., how many bars are included?), value queries (e.g., what is the value of XYZ?), or comparison questions (e.g., what is the largest bar in the bar graph?). As may be observed from the preceding examples, some queries may be relatively specific to the type of data visualization 120 in question. In other examples, however, the system 100 may be configured to provide answers to natural language queries that are independent of the type of data visualization being examined, and that may not even be submitted with respect to any specific data visualization containing the desired information. For example, if the data visualization 120 represented a graph of gross domestic product (GDP) of a plurality of countries, then the user might submit a natural language query such as, "which country has the highest GDP?", and thereby receive an identification of a specific country associated with a specific bar of the bar graph of the example data visualization 120.

In order to provide these and many other features and benefits, the application 108 includes a visualization generator 126 that is configured to provide a model trainer 128 with sufficient information to ultimately train elements of a data visualization (DV) query handler 130. In this way, the system 100 enables the DV query handler 130 to input a previously-unknown data visualization, such as the data visualization 120, along with one or more associated queries, and thereafter provide desired answers that have been extracted from the data visualization 120. More specifically, as illustrated, the visualization generator 126 includes a parameter handler 132, and the visualization generator 126 is configured to utilize parameters received by way of the parameter handler 132 to generate a visualization training dataset 134.

For example, continuing the example in which the data visualization 120 is a bar graph, the parameter handler 132 may receive parameters from a user of the application 108 that relate to the generation of a plurality of bar graphs to be included within the visualization training dataset 134. Such parameters may thus include virtually any characteristic or constraint of bar graphs that may be relevant for training purposes. By way of non-limiting example, such parameters may include a range of a quantity of bars that would be included, values for an X, Y, and/or Z axis of the various bar graphs to be generated, characteristics of keys/legends of the bar graphs, and various other aspects.

Received parameters also may include queries, types of queries, or query characteristics that may be relevant for training purposes. Again, such queries may be more or less specific to the type of data visualization being considered, or may simply include natural language questions or types of natural language questions, that may be answered using the techniques described herein.

Using the received parameters, the visualization generator 126 may generate the visualization training dataset 134, where the visualization training dataset 134 is understood to include a complete collection of data, data visualizations generated from the data, queries or query types that may be applied against the data and/or the data visualizations, and answers or answer types that correctly respond to corresponding queries or query types. In other words, the visualization training data set 134 provides an internally consistent dataset in which, for example, each query corresponds with specific data, where the data is represented with any corresponding data visualization, and the answer to the query is related to each of the query, the data, and the data visualization.

Put yet another way, the visualization training dataset 134 provides a "ground truth" of known query/answer pairs that are related through the generated data and corresponding data visualizations. As described in detail below, however, it is not necessary that the visualization training dataset 134 includes or represents any actual or correct real-world data. In fact, the visualization training dataset 134 may include random or nonsense words and values, that are only related to one another in the sense that, as referenced, they are internally consistent with respect to the data visualizations generated in conjunction therewith.

For example, if the data visualization 120 were used and included within the visualization training dataset 134, it may be observed that the label "XYZ" of the bar has no apparent, underlying relation to the value 3, other than the fact that the bar 124 has the value 3 within the data visualization 120. As described in detail herein, the DV query handler 130 may be configured to analyze an entirety of (at least a portion of) the data visualization 120 before attempting to answer a specific query, and thereby identifies and utilizes specific locations within the data visualization 120, in order to predict where and how desired information may be extracted therefrom. Consequently, the actual content or meaning of labels, values, or other words or numbers within the data visualization training dataset 134 are not necessary to derive the desired characteristics thereof in the context of the visualization training dataset 134. Of course, such content, including semantics, syntax, and meaning of included words or images may be considered if desired, including in the context of answering natural language queries. In any case, it may be observed at least from the above description that the described implementations of the visualization generator 126, model trainer 128, and DV query handler 130 may be configured to provide desired query answers, even when neither the query nor the answer in question was included within the visualization training dataset 134.

The ability of the visualization generator 126 to synthetically generate the visualization training dataset 134, without having to rely on, create, or identify real-world data visualizations, means that a very large and comprehensive training dataset may be quickly and easily obtained, for any of the various types of data visualizations and associated parameters that may be desired by a user of the application 108. As a result, the model trainer 128 may be provided with sufficient training data to result in reliable, accurate, and efficient operations of the DV query handler 130, as described below.

In the following description, the model trainer 128 is configured to provide training for one or more neural networks, and related models or algorithms, using the visualization training dataset 134. In the example of FIG. 1, several examples of such neural networks are provided, each of which is configured to provide specific functionalities with respect to operations of the DV query handler 130. Specifically, as shown, the model trainer 128 may be utilized to train a convolutional neural network (CNN) 136, a long/short term memory (LSTM) encoder 138, and an attention model 140. Specific examples and details regarding the CNN 136, the LSTM encoder 138, and the attention model 140 are provided below, and additional or alternative neural networks may be utilized, as well.

In general, such neural networks provide computational models used in machine-learning that are made up of nodes organized in layers. The nodes may also be referred to as artificial neurons, or just neurons, and perform a function on provided input to produce some output value. Such neural networks generally require a training period to learn parameters (e.g., weights) used to map an input to a specific output. As referenced above, the visualization training dataset 134 provides training examples that include a "ground truth" that is used by the model trainer 128 to train the various models 136, 138, 140.

Inputs to neural networks may be constructed in the form of one or more feature vectors. In general, a feature vector is an array of numbers, the array having one or more dimensions. Such feature vectors allow, for example, for numerical or vector representation of a word, an image, or other types of information or concepts. By representing concepts numerically in this way, otherwise abstract concepts may be processed computationally. For example, when representing a word as a feature vector, in the context of a plurality of words represented by corresponding feature vectors, a vector space may be defined in which vectors of similar words naturally occur near to one another within the vector space. In this way, for example, word similarities may be detected mathematically.

Using such feature vectors and other aspects of neural networks described above, the model trainer 128 may be proceed to execute training, using the training examples of the visualization training dataset 134, including executing a series of iterative rounds of training, in which optimal weight values for one or more mapping functions used to map input values to output values are determined. In determining the optimal weights, the model trainer 128 essentially makes predictions based on available data, and then measures the error and the predictions, using the ground truth available in conjunction with the visualization training dataset 134. The function used to measure such error levels is often referred to as a loss function, which is generally designed to sum over the relevant training examples, and add to the calculated loss if a prediction was incorrect, or reduced/minimized the calculated loss if the prediction was correct. In this way, the various models may be conceptually understood to be trained to learn from mistakes made during the various iterations of predictions, so that the resulting, trained models, as referenced, will be fast, efficient, and accurate when deployed in the context of the DV query handler 130.

In the example of FIG. 1, the model trainer 128 includes the convolutional neural network (CNN) 136, which represents a particular type of neural network that is especially configured for processing images. That is, because such convolutional neural networks make an explicit assumption that input features are images, properties may be encoded into the CNN 136 that caused the CNN 136 to be more efficient than a standard neural network, while reducing a number of parameters required by the CNN 136 relative to a normal neural network.

In more detail, the parameters of the CNN 136 may include one or more learnable filters, where each filter has spatial dimensions of width and height, while extending through a full depth of an input volume. For example, if an input to the CNN 136 includes an image, then a filter applied to the image may have an example size of 5×5×3, representing 5 pixels worth of width, 5 pixels worth of height, and 3 depth dimensions corresponding to potentially included color channels. To apply the CNN 136, each of the one or more filters is passed (in other words, convolved) across a width and height of filtered pixels of the input image. As the filter is convolved across the width/height and volume of the input image, a dot product or other appropriate calculation may be made between entries of the filter and each input position.

As referenced above with respect to neural networks, the parameters of the one or more filters will learn and be adjusted over time, so as to be activated in response to the desired type of visual feature (e.g., an image edge, an image orientation, a color, or some other image aspect for which the CNN 136 is being trained). Thus, once the CNN 136 has been successfully trained, the result will be, e.g., a set of parameterized filters in a corresponding plurality of layers, each of which produces a separate 2D feature map, which may then be compiled along the depth dimension to produce a total output feature map volume.

Further with respect to the model trainer 128, the LSTM encoder 138 refers to a particular type of recurrent neural network (RNN), which is designed to leverage information contained within sequential pieces of related information. That is, recurrent neural networks are described as recurrent due to executing a same or similar operation on each element of a sequence, where each output is dependent upon preceding computations.

For example, such a sequence may include a sentence or question included within each query of the visualization training dataset 134, because typical sentences represent sequences of related information, and later portions of such sequences/sentences may be more accurately deduced through consideration of earlier parts of the sentences. For example, this concept may be understood by considering that a sentence that begins "the man from Germany is fluent in . . . " may be used to determine the word "German" much more easily than attempting to deduce the word German in isolation from other text.

Thus, as may be generally observed, such recurrent neural networks rely on earlier-deduced information, which must thus be stored over time in order to be useful at a later point in the process. In practice, it may occur that a large distance (e.g., a large number of words within a sentence) exists between a current word and information necessary to determine a current word. Consequently, recurrent neural networks may suffer from storing more information than is practical or useful to store with respect to optimally determining current information.

In contrast, the LSTM 138 is particularly design to avoid this type of long-term dependency issue, and is capable of selectively storing useful information for sufficiently long periods of time to successfully determine currently-considered information. Thus, in the example of FIG. 1, the LSTM encoder 138 may be trained using input queries from the visualization training dataset 134, encoded as feature vectors, that minimize a loss function with respect to the ground truth answers included within the visualization training dataset 134 with respect to corresponding queries. As a result, as described in detail below, the DV query handler 130 may be configured to receive new queries with respect to newly-determined data visualizations, such as queries received with respect to the data visualization 120. The DV query handler 130 is thus configured to encode newly-received queries as feature vectors, even when the particular content of the received query was not necessarily or explicitly included within the visualization training dataset 134.

Finally with respect to the model trainer 128 of FIG. 1, the attention model 140 represents a mechanism for producing outputs that depend on a weighted combination of all input states, rather than depending on a particular input state (e.g., rather than depending on the last input state). In other words, the weights of the weighted combination of all input states signify an extent to which each input state should be considered for each output. In practice, the weights may be normalized to sum to a value of 1, to represent a distribution over input states. Put another way, the attention model 140 provides techniques for looking at an entirety of input states, before determining whether and to what extent each input state should be considered to be important.

In operation, the attention model 140 may be trained using outputs of the CNN 136 and LSTM encoder 138. In other words, inputs to the attention model 140 during training may include an encoded feature map of a specific data visualization of the visualization training dataset 134, while an output of the LSTM encoder 138 includes a feature vector encoded from a corresponding query directed against the same data visualization of the CNN 136. As described herein, the visualization training dataset 134 also includes a known answer of the considered query with respect to the considered data visualization, so that assignments of weight/weight values may be judged, and a loss function of the attention model 140 may be minimized.

Of course, the example of the model trainer 128 should be understood to be non-limiting, in that various or alternative types of neural networks may be utilized. For example, multiple convolutional neural networks may be utilized, each trained to identify different image aspects of one or more input images. Other aspects of the model trainer 128 are provided as examples below, e.g., with respect to FIGS. 3-5, or would be apparent to one of skill in the art.

Once training has been completed, the DV query handler 130 may be deployed to receive new data visualizations and associated queries. In operation, for example, the DV query handler 130 may include a DV feature map generator 142 that utilizes the trained CNN 136 to process an input data visualization, such as the data visualization 120. As described above, the DV feature map generator 142 is thus configured to generate a feature map of feature vectors representing the data visualization 120.

Meanwhile, a query feature vector generator 144 may be configured to utilize the LSTM encoder 138 trained by the model trainer 128. In other words, a query received may be encoded by the query feature vector generator 144 as a corresponding query feature vector. For example, a query may be received such as "what is the value of XYZ?"

Then, an answer location generator 146 may be configured to use the trained attention model 140 to combine the feature map of the DV feature map generator 142 representing the data visualization 120, along with the query feature vector generated by the query feature vector generator 144, to thereby predict one or more pixel locations within the data visualization 120 at which the answer to the encoded query feature vector is most likely to be found. More particularly, as described in more detail below, e.g., with respect to FIG. 3, an attention map generator 148 may be configured to take an attention weight distribution provided the attention map generator 148, for multiplication against the feature map produced by the DV feature map generator 142, to thereby enable a feature weight generator 150 to generate an attention-weighted feature map for the data visualization 120, with respect to the received query. The resulting attention-weighted feature map may then be processed to determine a single, representative feature vector for the data visualization 120, where this resulting DV feature vector may be combined with the query feature vector of the query feature vector generator 144 using an answer vector generator 152, to thereby generate a corresponding answer vector.

As a result, an answer generator 154 may receive the generated answer vector, and may proceed to utilize the one or more predicted answer locations to thereby output the desired answer. Specifically, for example, the answer generator 154 may include a boundary generator 156 that is configured to determine a boundary around a particular location and number of pixels in which the answer is predicted to occur. For example, in the example of FIG. 1, a boundary 157 around the label XYZ may be determined by the boundary generator 156.

In some examples, the boundary 157 may represent an implicit or background identification of a location within the data visualization 120, used internally by the system 100. In other example implementations, a view generator 158 of the answer generator 154 may be configured to explicitly illustrate a visual boundary (e.g., a rectangular box) around the label XYZ within the data visualization 120.

Similarly, the view generator 158 may be configured to draw various other types of elements overlaid upon the data visualization 120, in order to convey a desired answer. For example, as illustrated, if a received query is "which bar has the value 3?", then the boundary generator 156 and the view generator 158 may be configured to draw and render a visible rectangular box as the boundary 157. In another example, if the query is "what is the value of XYZ?", then the boundary generator 156 and the view generator 158 may be configured to render a dotted line 159 illustrating that a level of the bar 124 corresponding to the label XYZ equates to a value of 3.

Of course, a manner in which answers or potential answers are provided to the user of the user device 112 may vary substantially, depending on the context of particular implementations of the system 100. For example, a user submitting a query to a search application may receive links to documents containing data visualizations that include the desired answer, perhaps with some identification of the individual data visualization within the linked document(s). In other example implementations, such as when the user is searching within the single document 116, the determined answer may simply be provided as text output, e.g., in conjunction with an answer bar displayed adjacent to the query bar 118. Other techniques for providing answers are provided as example implementations described below, or would be apparent to one of skill in the art.

In other example aspects of the answer generator 154, described in more detail below (e.g., with respect to FIG. 9), a source data generator 160 may be configured to capture all, or a specified portion of, the data underlying any particular data visualization, such as the data visualization 120. That is, as referenced above, a normal process for authoring or creating a particular data visualization is to compile or collect data using one of many available software applications equipped to generate data visualizations, such as Excel, MatLab, or many other spreadsheet or computational software applications, and thereafter utilize features of the specific software application to configure and render the desired data visualization. As described herein, such software applications typically render the resulting data visualizations in the context of an image file, so that the original source data is only available indirectly, e.g., through visual observation of the generated data visualization.

Using the system 100, the source data generator 160 may apply a structured set of queries against the data visualization 120, to thereby incrementally obtain and determine the source data from which the data visualization 120 was generated. Once this source data has been determined, the source data may be utilized for any conventional or future use of the relevant type of data, some examples of which are provided below. For example, a user of the user device 112 may convert the data visualization 120 from a bar graph format into any other suitable or available type or format of data visualization. For example, the user may simply select or designate the data visualization 120, and then request that the data visualization 120 (bar graph) be re-rendered as a pie chart.

In various implementations, the application 108 may utilize or leverage a number of available tools or resources, which may be implemented internally or externally to the application 108. For example, in FIG. 1, an optical character recognition (OCR) tool 162 may be utilized by the answer generator 154 to assist in generating a determined answer. For example, as described, a query such as "which bar has a value of 3?" may have an answer of XYZ in the example of the data visualization 120. The answer generator 154 is configured to predict the location at which the answer XYZ occurs within the data visualization 120, using the answer vector provided by the answer location generator 146, perhaps in conjunction with the boundary generator 156.

However, in the example of FIG. 1, as described, the answer location includes a number of identified pixels within the image of the data visualization 120, and not the actual (e.g., editable) text of the label itself. Consequently, it will be appreciated that the OCR tool 162 may be utilized to perform directed optical character recognition within the boundary 157, to thereby output text XYZ as the answer to their received query.

In other example aspects of the system 100, a collection 164 of source data queries may be pre-stored in an available memory. In this way, the selected/appropriate ones of the stored source data queries 164 may be utilized by the source data generator 160 to analyze a specific, corresponding type of data visualization, and thereby output resulting source data 166 for the examined data visualization. For example, the application 108 may be configured to search multiple types of data visualizations, such as bar graphs and pie charts. Thus, the source data queries 164 may include a first set of source data queries designed specifically for recovering source data of a bar graph. The source data queries 164 may also include a second set of source data queries that are designed specifically for recovering source data of the pie chart type of data visualization.

Also in the example of FIG. 1, a visualization generator 168, similarly to the OCR tool 162, represents a suitable software application for utilizing the source data 166 to generate a new or modified data visualization therefrom. For example, as in the implementation referenced above, the data visualization 120 may initially be viewed as the illustrated bar graph, and, in response to a user request, the source data generator 160 may apply a suitable set of source data queries from the source data queries 164, to thereby recover the source data of the observed bar graph within the source data 166. Thereafter, the visualization generator 168, such as Excel, MatLab, or other suitable software applications or portions thereof, may be configured to render the recovered source data from the source data 166 as a pie chart.

In the example of FIG. 1, when receiving a data visualization, such as the data visualization 120 being received at the DV feature map generator 142, the OCR tool 162 (or similar OCR tool) may be used to pre-determine all (e.g., a list) of the text within the data visualization 120, as well as their respective locations, including but not limited to bar labels, numbers, axis labels, titles, and information in legends. The location for each text item may be defined using a bounding rectangle that contains the text item, such as described herein with respect to boundary 157.

Thus, input to the neural network(s) of system 100, or to the system 100 as a whole, may include inputs derived from such a list of text items present in the data visualization. In this way, for example, by providing the OCR output earlier, the resulting text items may be used to facilitate, enhance, or verify desired answers. For example, when the answer location generator 146 or the answer generator 154 operate(s) to output a predicted answer location and/or answer, the results may be compared against the previously-determined text items. Further, once the answer location is predicted, a relevant text item of the previously-identified text items may be identified and output as the desired answer.

Figure 2:
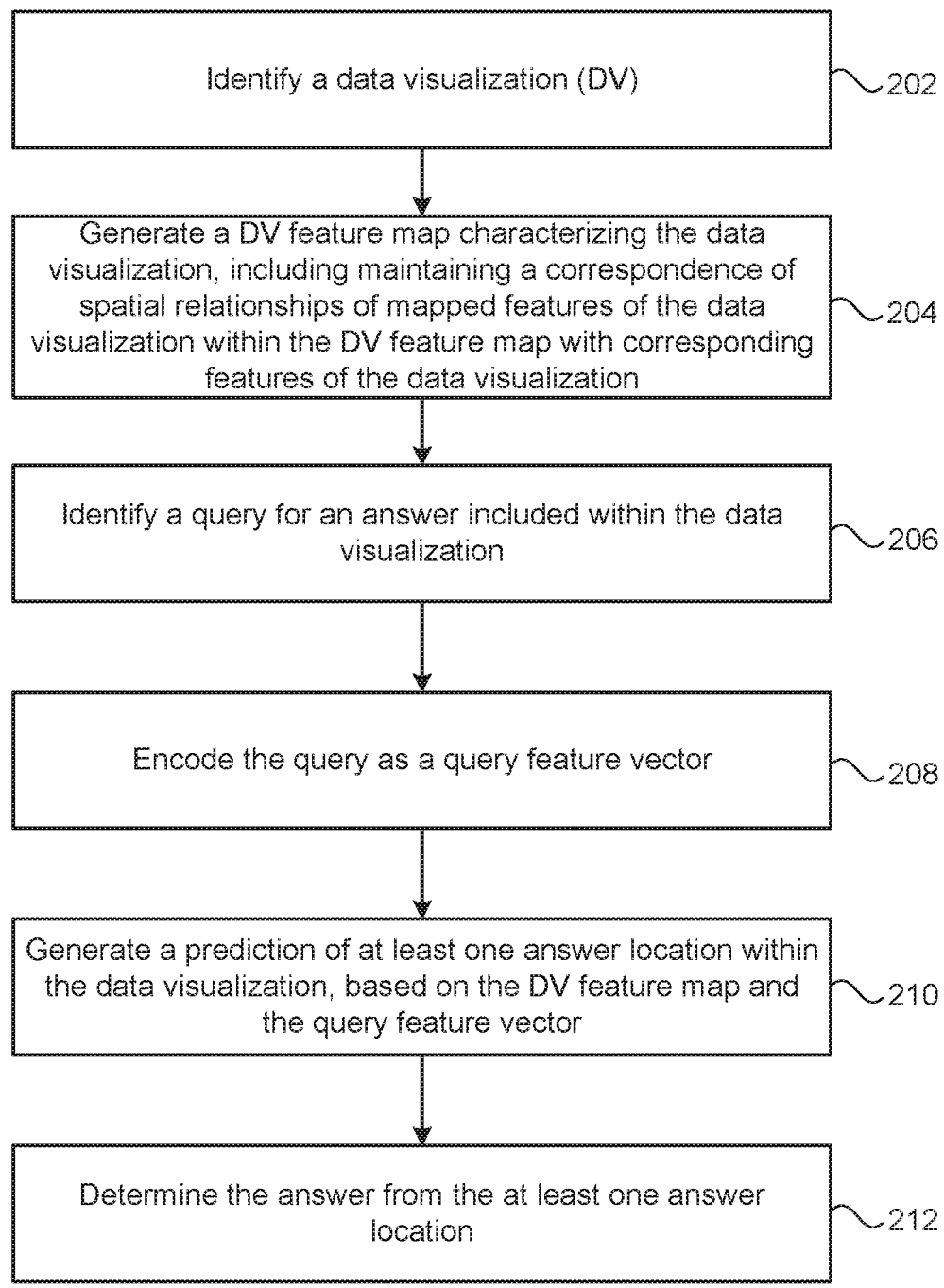
FIG. 2 is a flowchart illustrating example operations of the system of FIG. 1.

FIG. 2 is a flowchart 200 illustrating example operations of the system 100 of FIG. 1. In the example of FIG. 2, operations 202-212 are illustrated as separate, sequential operations. However, it will be appreciated that, in various implementations, additional or alternative operations or sub-operations may be included, and/or one or more operations or sub-operations may be omitted. Further, it may occur that any two or more of the operations or sub-operations may be executed in a partially or completely overlapping or parallel manner, or in a nested, iterative, looped, or branched fashion.

In the example of FIG. 2, a data visualization (DV) is identified (202). For example, the DV feature map generator 142 of FIG. 1 may identify the data visualization 120. As described, the DV feature map generator 142 may specifically identify the data visualization 120 in response to a user selection thereof, or may identify the data visualization 120 in the context of searching a plurality of data visualizations included within one or more documents or other types of content files. As also referenced, the identified data visualization may be included within an individual image file, or an image file that is embedded within, or included in, any other type of file, including text, image, or video files.

A DV feature map characterizing the data visualization may be generated, including maintaining a correspondence of spatial relationships of mapped features of the data visualization within the DV feature map with corresponding features of the data visualization (204). For example, the DV feature map generator 142 may execute the trained CNN 136 to generate the referenced feature map. As just referenced, it may be trained to apply a set of filters over the data visualization 120 to obtain a collection of feature vectors that together form a feature map for the image of the data visualization 120. Using, for example, techniques described in more detail below with respect to FIG. 3, the trained CNN 136 may be configured to output the feature map with the included feature vectors having spatial positions and orientations that correspond to the original image.

A query for an answer included within the data visualization may be identified (206). For example, as described herein, such a query may be received by way of the query bar 118 rendered in conjunction with the document 116, or in conjunction with a search application configured to search across a plurality of documents.

The query may be encoded as a query feature vector (208). For example, the query feature vector generator 144 may be configured to implement the trained LSTM encoder 138 to output an encoded version of the received query as the described query feature vector.

A prediction of at least one answer location within the data visualization may be generated, based on the DV feature map and the query feature vector (210). For example, the answer location generator 146 may be configured to implement the trained attention model 140, including inputting outputs of the DV feature map generator 142 and the query feature vector generator 144. Accordingly, by considering the query feature vector in conjunction with the DV feature map, the answer location generator 146 may determine one or more pixel locations within the original image of the data visualization 120 at which the desired answer may be determined or deduced.

Consequently, the answer may be determined from the at least one answer location (212). For example, the answer generator 154 of FIG. 1 may output or identify one or more image portions within the image of the data visualization 120 at which the answer may be found, including, in some implementations, rendering additional visual elements overlaid with the data visualization 120 (e.g., the boundary 157 or the value line 159). In other examples, the answer generator 154 may output, perhaps using the OCR tool 162, answer text that is read from within the predicted answer location, in order to provide the answer.

Figure 3:
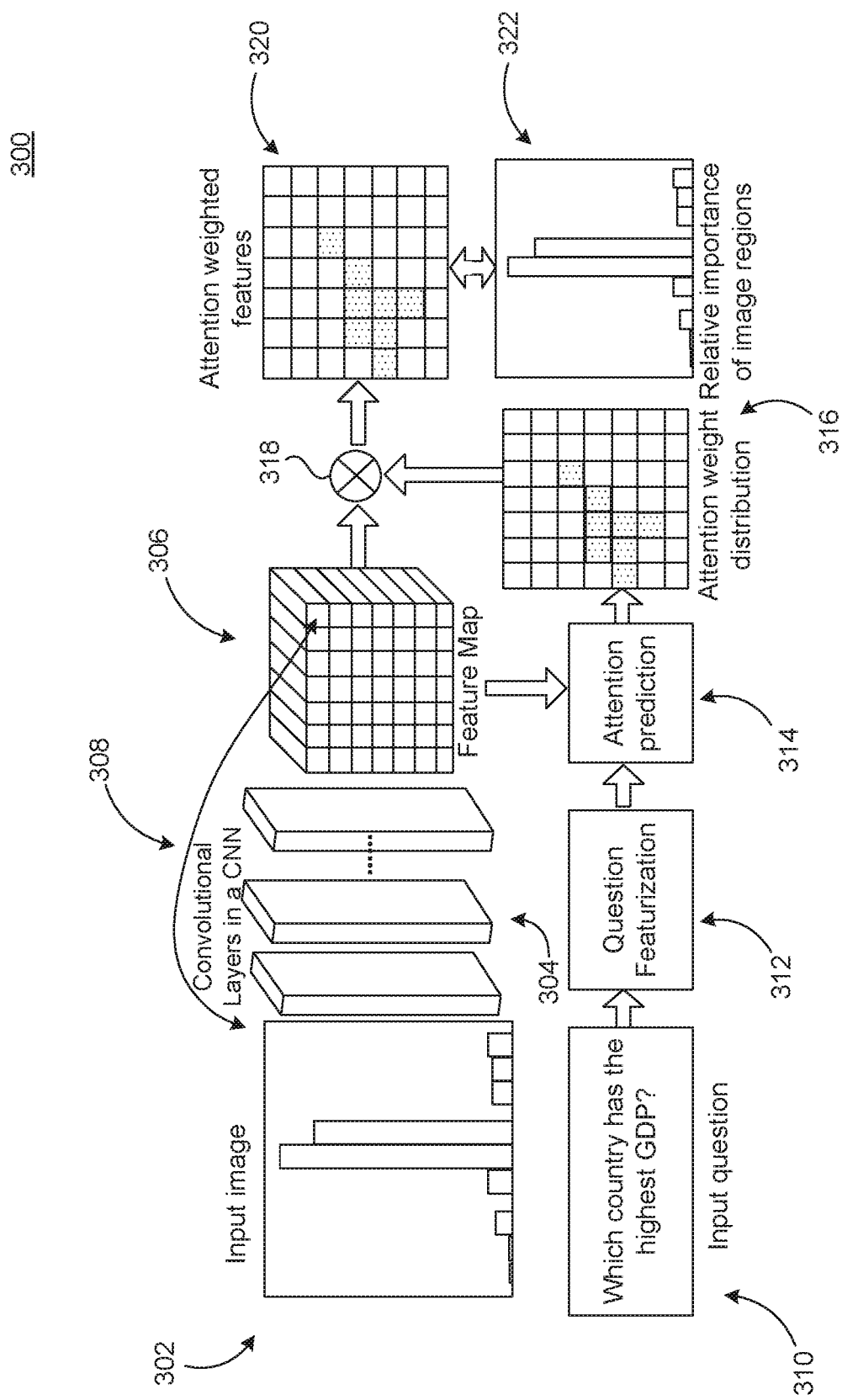
FIG. 3 is a block diagram illustrating a more detailed example implementation of the system of FIG. 1.

FIG. 3 is a block diagram illustrating a more detailed example implementation of the system 100 of FIG. 1. As shown, an input image 302 of a data visualization (e.g., bar graph) is passed through a trained CNN 304 to produce a resulting feature map 306, as described above. In the specific example of FIG. 3, the at least one CNN filter described above may be convolved over the input image 302, such that, at every location in a 14×14 grid, a feature vector is identified, e.g., a 512 dimensional feature vector. In other words, at each such location, an encoding of the image 302 is obtained that captures relevant aspects of included content of the image at that location.

In conventional CNN approaches, spatial information regarding different image regions of a digital image may be lost or reduced. In the example of FIG. 3, the digital image 302 is encoded using only the convolutional layers of the VGG-16 network. The resulting feature map 306 thus has dimensions 512×14×14, which correspond to the defined dimensions of the original input image 302, and which preserves the spatial information from the original input image 302, as described in more detail, below. For example, as illustrated by an arrow 308, an upper right hand portion of the input image 302 corresponds directly to an upper right hand portion of the feature map 306.

In more detail, some CNNs contain fully connected layers that lose all spatial information. In the example of FIG. 3, convolutional layers and pooling layers are used, where pooling layers refer generally to layers used in between successive convolutional layers used to reduce the spatial size of the representation (e.g., to reduce the required parameters/computation in the network). Such approaches maintain at least a portion of the spatial information (e.g., some of the spatial information may get reduced). During decoding, unpooling layers may be used to offset or restore at least some of any spatial resolution that is lost during the above-referenced types of processes.

Further in FIG. 3, an input question 310, illustrated as a sample query "which country has the highest GDP?", may be encoded as part of a process of question featurization 312. For example, as described above with respect to FIG. 1, the question featurization 312 may be executed using the trained LSTM model to encode the input question 310.

Subsequently, the feature map 306 and the query feature vector encoding the input question 310 may be input to an attention prediction process 314. Conceptually speaking, the attention prediction 314 outputs an attention map 316 that represents where, within the input image 302, attention should be paid to determine the answer to the input question 310. That is, as shown in FIG. 3, the attention map 316 includes a distribution of attention weights at specified locations of the attention map 316. For example, as referenced above, each attention weight of the attention weight distribution may be assigned a value between 0 and 1, so as to obtain a normalized distribution across this value range. Meanwhile, each location of the feature map 306 represents a feature vector representing that location of the input image 302. Then, by multiplying the attention map 316 with the feature map 306 during a multiplication process 318, the attention weighted distribution of the attention map 316 may effectively be applied to each of the feature vectors of the feature map 306.

For example, with reference to the location of the input image 302 and the feature map 306 that is designated by the arrow 308, it may occur that a corresponding feature vector is assigned an attention weight value of 0, so that a resulting map 320 of attention weighted features would have a value (importance) of 0 at that location with respect to the current query/answer pair. Consequently, no answer would be predicted to be found at that location. On the other hand, if the reference to feature vector is assigned a weight of 1 from the attention weighted distribution of the attention map 316, then the attention weighted feature corresponding thereto within the map 320 would be very likely to include information related to the predicted answer.

Finally with respect to FIG. 3, an image 322 illustrating relative importance levels of various image regions of the original input image 302, with respect to the input question 310, may be generated. For example, such an image may be explicitly rendered, as illustrated below in the context of the example of FIG. 7. In other examples, the image 322 need not be explicitly generated and rendered for the user, but may simply be used by the application 108 to generate the requested answer.

Figure 4:
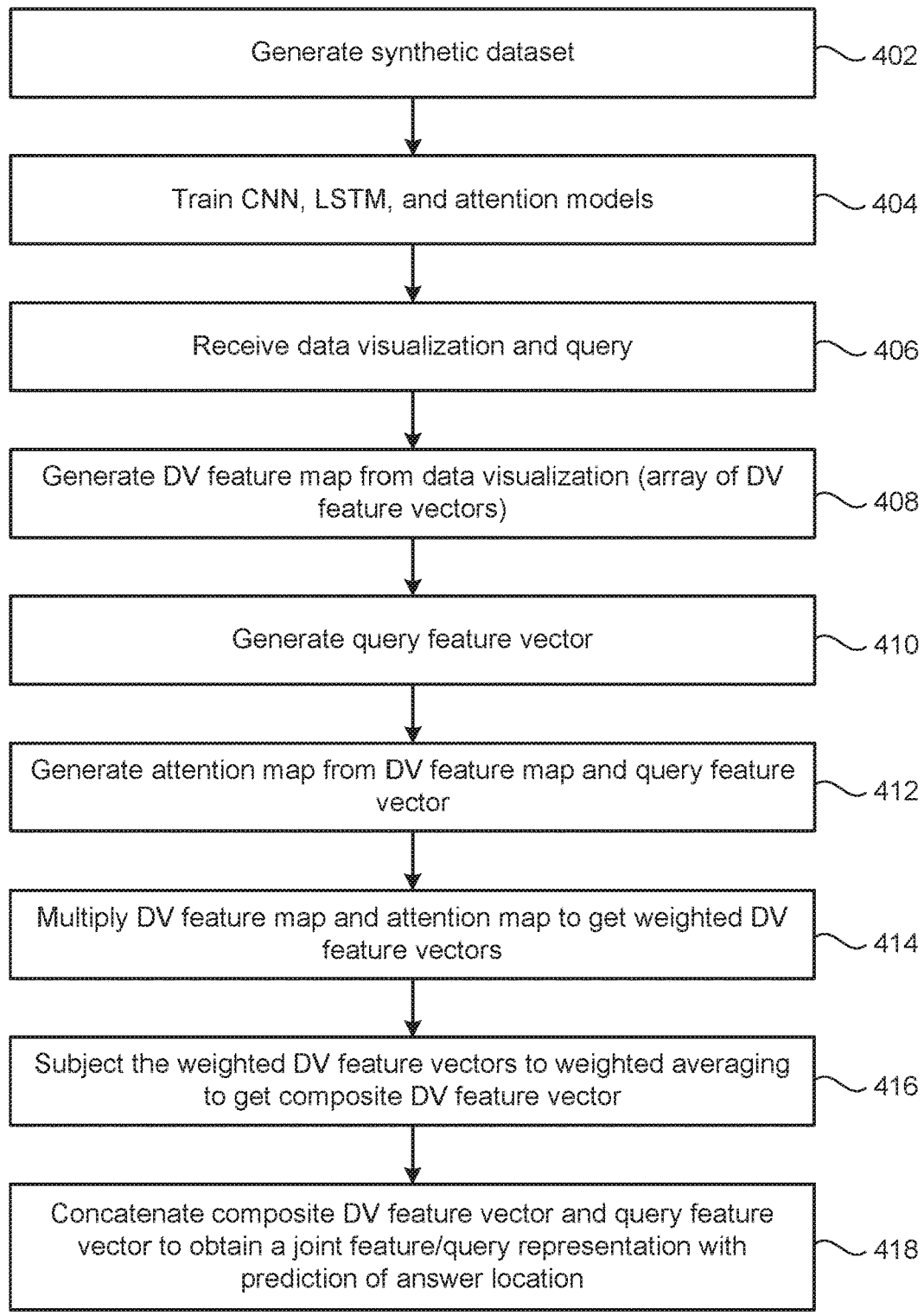
FIG. 4 is a flowchart illustrating example operations of the system of FIG. 3.

FIG. 4 is a flowchart 400 illustrating more detailed example implementations of the systems of FIGS. 1 and 3. In the example of FIG. 4, a synthetic dataset is generated (402). For the example, the visualization generator 126 may receive necessary parameters, e.g., received via the parameter handler 132, and may thereafter generate the visualization training dataset 134. As described, the necessary parameters received at the parameter handler 132 may vary, depending on various factors. For example, as referenced, different parameters may be required for different types of data visualizations, or different types of expected queries. The parameters may be used to parameterize the generation of desired ranges or values, including random number generators and random word generators.

The synthetic dataset, e.g., the visualization training dataset 134, may then be used to train desired neural network models, including, e.g., CNN, LSTM, and attention models (404). For example, the model trainer 128 may be utilized to train the models 136, 138, and 140.

Subsequently, a data visualization and query may be received (406). For example, a new data visualization may be received directly from the user, or indirectly by way of a search application. In some implementations, the search process may be configured to make an initial determination regarding a presence or inclusion of the data visualization of the type for which the visualization training dataset 134 was generated. For example, such a configured search application may perform a scan of searched documents, so as to determine a presence or inclusion of at least one bar graph, in scenarios such as FIG. 1 in which the visualization training dataset 134 is generated with respect to bar graphs. In this regard, various techniques may be used. For example, a text search could include the search for the words bar graph, bar chart, or similar. In other example implementations, an initial image recognition process could be performed to identify easily recognizable features of the relevant type of data visualization, such as perpendicular axis that may be included within a bar graph.

Subsequently, a DV feature map may be generated from the data visualization, the DV feature map including an array of DV feature vectors (408). For example, the DV feature map generator 142 of FIG. 1 and/or the convolutional layers in a CNN 304 of FIG. 3 may be utilized, so as to obtain, e.g., the feature map 306.

A query feature vector may be generated (410). For example, the query feature generator 144 and/or the question featurization process 312 may be utilized to obtain a corresponding query feature vector for, e.g., the input question 310.

An attention map may then be generated from the DV feature map and the query feature vector (412). For example, the attention map generator 148 and/or the attention prediction process 314 may be utilized to generate an attention map, such as the attention map 316 of FIG. 3. As referenced above and illustrated with respect to FIG. 3, the attention map 316 includes a distribution of normalized attention weights, each attention weight assigned to a particular location of the attention map.

Consequently, the attention map may be multiplied with the DV feature map to obtain weighted DV feature vectors (414). For example, the feature weight generator 150 may be utilized to execute the multiplication process 318 of FIG. 3, to obtain the map 320 of attention weighted feature vectors for the feature vectors of the feature map 306.

Further in the example of FIG. 4, the weighted DV feature vectors may be subjected to weighted averaging to obtain a composite DV feature vector (416). By generating such a composite DV feature vector for the weighted distribution of feature vectors, it becomes straightforward to concatenate the composite DV feature vector with the original query feature vector, to thereby obtain a joint feature/query representation that is used for prediction of the answer location (418).

Figure 5:
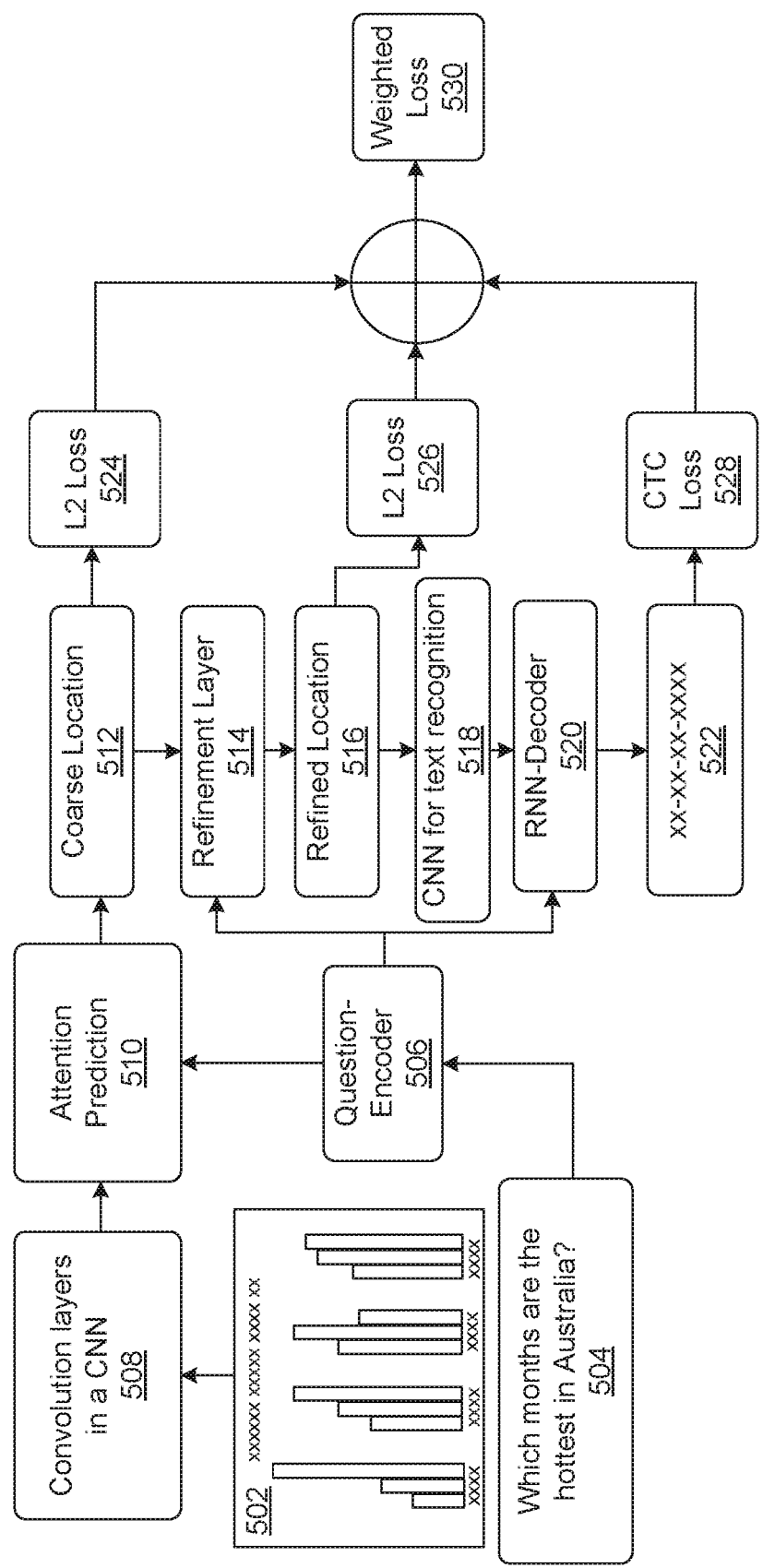
FIG. 5 is a block diagram illustrating a more detailed example implementation of the system of FIG. 3.

For example, in the example given above for FIG. 3, in which the feature map 306 has dimensions 512×14×14, the resulting vector of dimension 512×14×14 (may be re-written as 196×512) retains the spatial information, such that each of these 196 vectors with dimension 512 comes from a specific part of an image, and therefore retains the spatial information in the input image. To create a single vector as just described with respect to FIG. 4, a relative importance may be predicted for each of the 196 regions, using 196 different numbers that sum to 1.0. For example, if, for a given question and image, only the (hypothetical) region 10 is important, then the composite vector will have a value of 1.0 in that location and 0 elsewhere. In this case, the resulting single vector is simply a copy of the $10^{th}$ vector from earlier 196*512-dimensional vector. If a ninth location is determined to be 70% important while an eighth location is 30% important, then the resulting single vector would be calculated as (0.7*$9^{th}$ vector+0.3*$8^{th}$ vector). FIG. 5 is a block diagram of an alternate implementation of the systems of FIGS. 1 and 3. In the examples of FIGS. 1 and 3, one or more answer locations are ultimately predicted. As described with respect to FIG. 1, the answer generator 154 may be configured to utilize the predicted answer location to extract the desired answer therefrom. For example, the boundary generator 156 may be configured to identify a boundary around a predicted answer location, whereupon the OCR tool 162 may be leveraged to simply read the desired answer from the predicted location.

In the example of FIG. 5, a further refinement step to this type of boundary box prediction may be included, in order to provide an end to end question/answer process for bar graphs, without relying upon the availability of the OCR tool 162. For example, the system 500 of FIG. 5 may be configured to decode information within the predicted answer locations to provide the desired answer. For example, answers may be decoded one character at a time, or, in the case of common answers such as "yes" or "no," answers may be decoded as single, identified tokens.

Further, an input image of a data visualization 502 is received. In the example of FIG. 5, the system 500 also inputs an input question 504 (illustrated as a random sample question "which months are the hottest in Australia?").

As already described, the query 504 may be processed as part of a question encoding process at a question encoder 506, while the input image 502 may be processed through the convolution layers of a trained CNN 508. The various types and aspects of the attention prediction 510 described above with respect to FIGS. 1-4 may be implemented using the outputs of the question encoder 506 and the trained CNN 508, in order to obtain a predicted coarse location 512.

In other words, the coarse location 512 represents a relatively high level or first pass prediction at a desired answer location. Subsequently, the question encoder 506 may also output the encoded question (e.g., the query feature vector) to a refinement layer 514, which outputs a more refined location 516.

In the example of FIG. 5, it is assumed that a CNN for text recognition 518 has been trained by the model trainer 128, as part of the training process leveraging the visualization training dataset 134. The resulting text recognition process may be further refined by an RNN decoder 520, using the original query feature vector provided by the question encoder 506.

In FIG. 5, output 522 represents the output of the RNN-decoder 520. For example, for a particular label (e.g., "USA"), the RNN will make predictions at each location in the image for possible locations of the label. However, these locations may be spaced very close to each other, so that, e.g., several locations may be on the same letter. Consequently, in the example, the output may be multiple "U"s, then several "S"s, and so on. Output 522 represents the return of an output followed by a transitioning to a new letter (represented by the dash(es) in 522). For example, the output may be "UUU-SS-AAAA", to convey "USA", illustrated generically in FIG. 5 as "xx-xx-xx-xxxx."

Further in FIG. 5, elements 524, 526, 528 are example loss functions, which may be used during training to determine whether answers have been correctly predicted. For example, 524 may represent a least squares (L2) loss, and would thereby compare the coarse location 512 to a "ground truth" location. That is, at each pixel in the image, the coarse location prediction would be tested for matching the ground truth location. A similar process would be followed for 526, but using the refined location 516. The CTC loss 528 represents a loss that is designed for words, to see if the characters in the word are correct, such as from output 522. Any mistakes made in the coarse location, refined location, or RNN output will show up in the respective loss functions, which may then be combined into a single loss 530. The single loss 530 may then be used to correct any mistakes made in the neural network.

Figure 6:
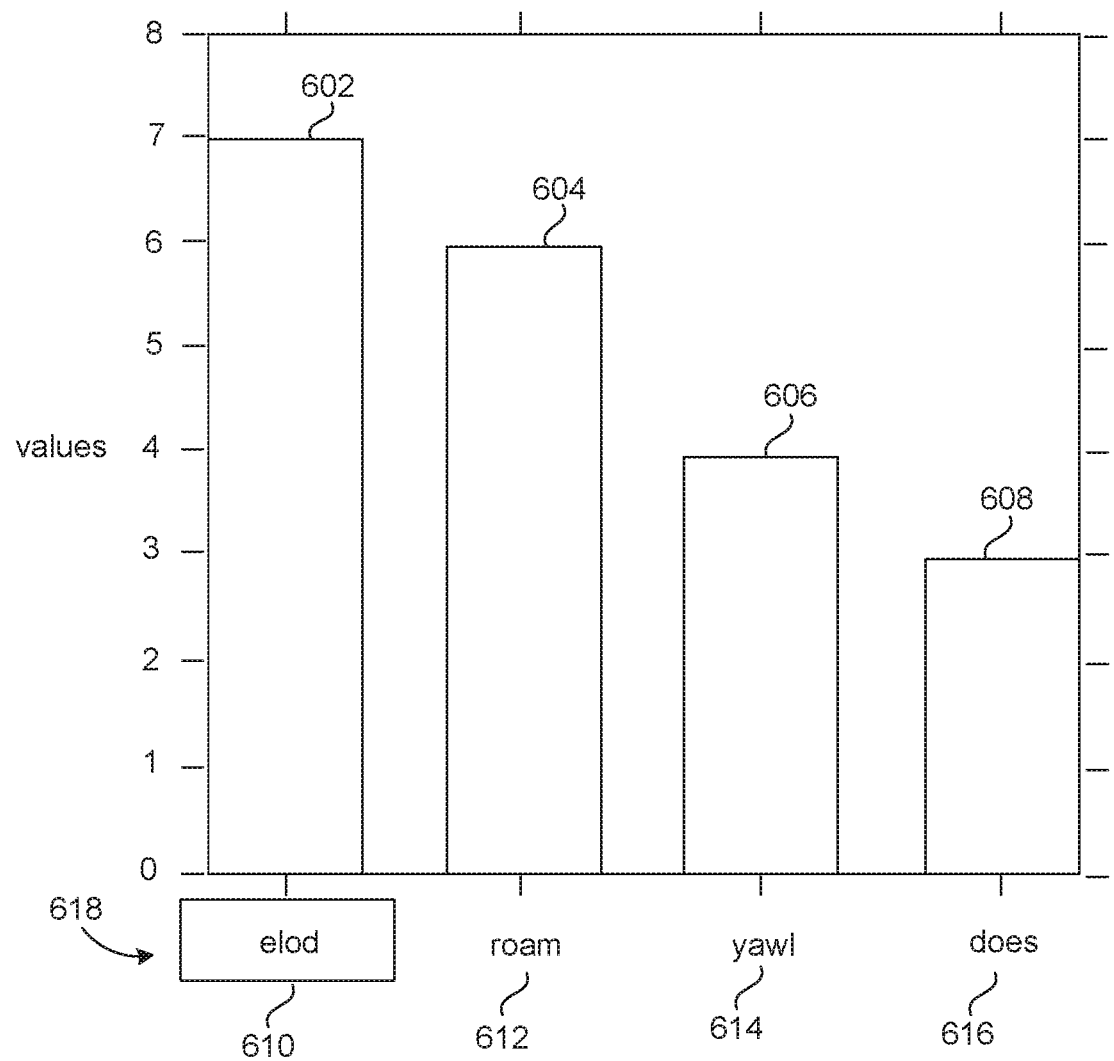
FIG. 6 illustrates a first example data visualization that may be utilized in conjunction with the example implementation of the systems of FIGS. 1-5.

FIG. 6 is an example bar graph that may be generated and included within the visualization training dataset 134. As shown, the example bar graph of FIG. 6 includes a bar 602, a bar 604, a bar 606, and a bar 608. Each of the bars 602-608 is associated with a corresponding respective label 610, 612, 614, and 616. As referenced above, and as illustrated in the example of FIG. 6, the various labels 610-616 may be generated randomly, and without requiring any specific regard for any semantic or contextual meaning to the terms used.

Thus, the label 610 is illustrated as the word "elod," the label 612 is illustrated as the word "roam," the label 614 is illustrated as the word "yawl" and the 616 is illustrated as the word "does." In the example, the bar graph of FIG. 6 may be included within the visualization training dataset 134 in conjunction with the illustrated, example query, i.e., "what is the largest bar?", along with the correct answer, i.e., the label 610 of "elod." As may be observed again, the illustrated bar graph, the example question, and the corresponding answer are all internally consistent, and thereby provide a suitable ground truth answer for purposes of training based on the example of FIG. 6, even though the label "elod" is a nonsense word.

Further, a boundary box 618 may be generated to predict the correct answer as part of the training process, so that the training process may evaluate appropriate sizes thereof. For example, the generated boundary box 618 must be large enough to ensure capture of an entirety of the label 610, without being so large as to include other text or content.

Thus, FIG. 6 illustrates an example of a comparative or reasoning type of question/answer, such as determining a largest-included bar. Of course, similar types of comparison/reasoning questions may be utilized, such as questions related to finding a smallest bar, or a comparison of an individual bar relative to another individual bar (e.g., whether the second bar is larger or smaller than the $4^{th}$ bar).

In these and similar examples, answers may be provided as one or more of the individual labels (e.g., one of the labels 610-616), or may be provided with respect to an identification of a bar as such, such as using "the second bar" as a valid answer. More generally, questions may be answered using any suitable format corresponding to the form of the received query. For example, in a similar context, a yes/no answer may be provided to the various types of queries just referenced, such as when a query is posed as "is the first bar the highest bar?"

Structural questions related to discerning a structure of a particular bar graph may also be considered. For example, such structural questions might include "how many bars are there?", or "how many bars are included per label?" (e.g., in example training datasets in which multiple bars may be included for each label, as illustrated and described below with respect to FIG. 8).

As already referenced and illustrated above with respect to FIG. 1, it is possible to answer specific value-based questions, such as "what is the value of the highest bar?", as illustrated in FIG. 1 with respect to the value line 159 that illustrates a value of the second bar 124 as being equal to 3. In various implementations, the bar graph used for training may include a predetermined range of integers for values, so that training for identifying such values may be implemented using a fixed number of answer classes in conjunction with a soft max classifier model that is trained by the model trainer 128 to give probabilities for each label/value.

In additional or alternative implementations, and in many real-world applications, the value range of a bar graph may include a continuous range of values rather than a discrete set of predetermined values. In such scenarios, a model may be trained using the model trainer 128 that directly regresses for an actual value of a specific bar, rather than relying on a predetermined set of value answers.

Figure 7:
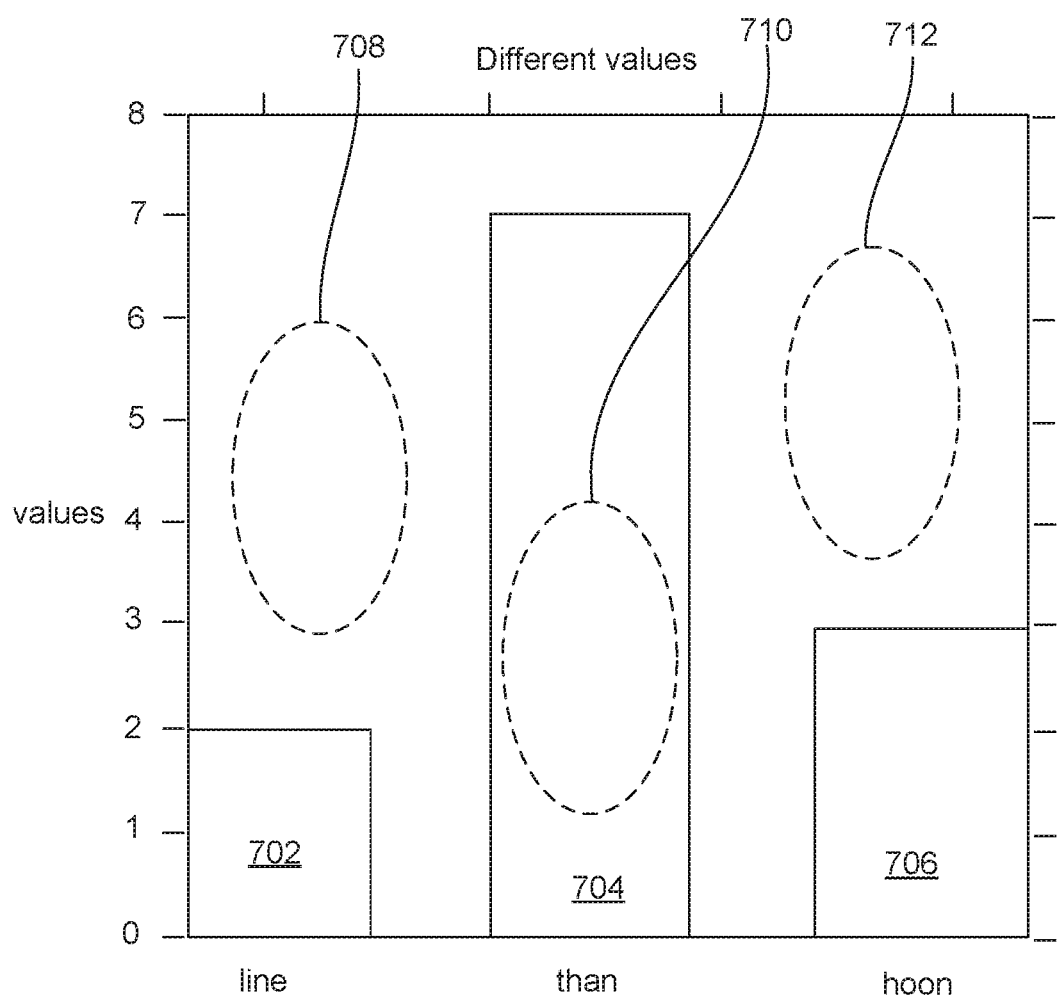
FIG. 7 illustrates a second example data visualization that may be utilized in conjunction with the example implementation of the systems of FIGS. 1-5, illustrating results of an applied attention map.

FIG. 7 illustrates an example of attention-weighted feature vectors for an input data visualization image. In the simplified example of FIG. 7, a bar graph is illustrated with a bar 702, a bar 704, and a bar 706. As may be observed, the second bar 704 is the largest of the 3. Consequently, for a question "is the second bar greater than the third?", the illustrated attention-weighted features will result in areas 708, 710, and 712 being identified. As may be observed, the identified answer locations 708, 712 are relevant because they identify an absence of bar values for the bars 702, 706 at the corresponding value ranges, while the area 710 is relevant for identifying that the bar 704 does include values within the value ranges relevant to answering the received question.

Although FIG. 7 illustrates one non-limiting example of an attention map, such as when possible answer locations are highlighted. It will be appreciated, however, that other techniques may be used to predict an answer location within a data visualization. For example, answer locations may be directly derived, e.g., as xy coordinates, without explicitly generating an attention map. In other examples, answer locations may be predicted and illustrated using a set(s) of rectangles or other appropriate shapes.

Figure 8:
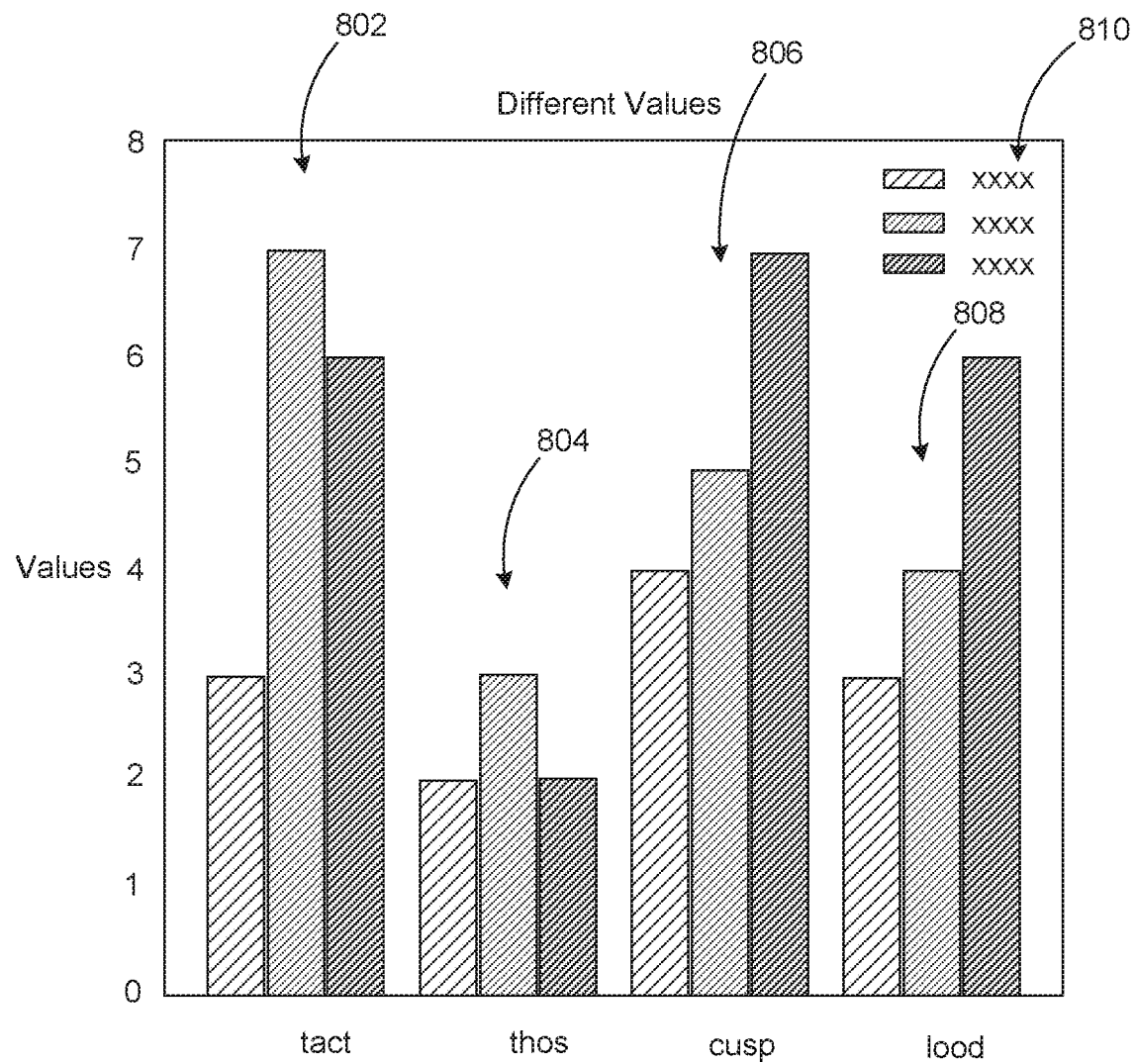
FIG. 8 illustrates a third example data visualization that may be utilized in conjunction with the example implementation of the systems of FIGS. 1-5.

FIG. 8 provides another example bar graph that may be used in the visualization training dataset 134, and for which questions could be answered using the DV query handler 130. As shown in FIG. 8, and referenced above with respect to FIG. 6, the example of FIG. 8 includes groups of bars 802, 804, 806, and 808, so that each group of bars correspond to a single label. For example, each bar of each group may represent one of three countries, companies, or other type of entity, and each label may identify a particular characteristic of each of three entities. In this way, for example, three companies might be considered relative to one another with respect to labels such as number of employees, total annual income, or other characteristic.

All of the above descriptions are relevant for the use of the example bar graph of FIG. 8, with FIG. 8 further illustrating that many different types of data visualizations may be utilized, and may be easily generated for inclusion within the visualization training dataset. For example, it may be observed that a question such as "how many groups are there per label?" may be included for the type of bar graph of FIG. 8, even though such a question might be meaningless or not useful with respect to other types of data visualizations.

Figure 9:
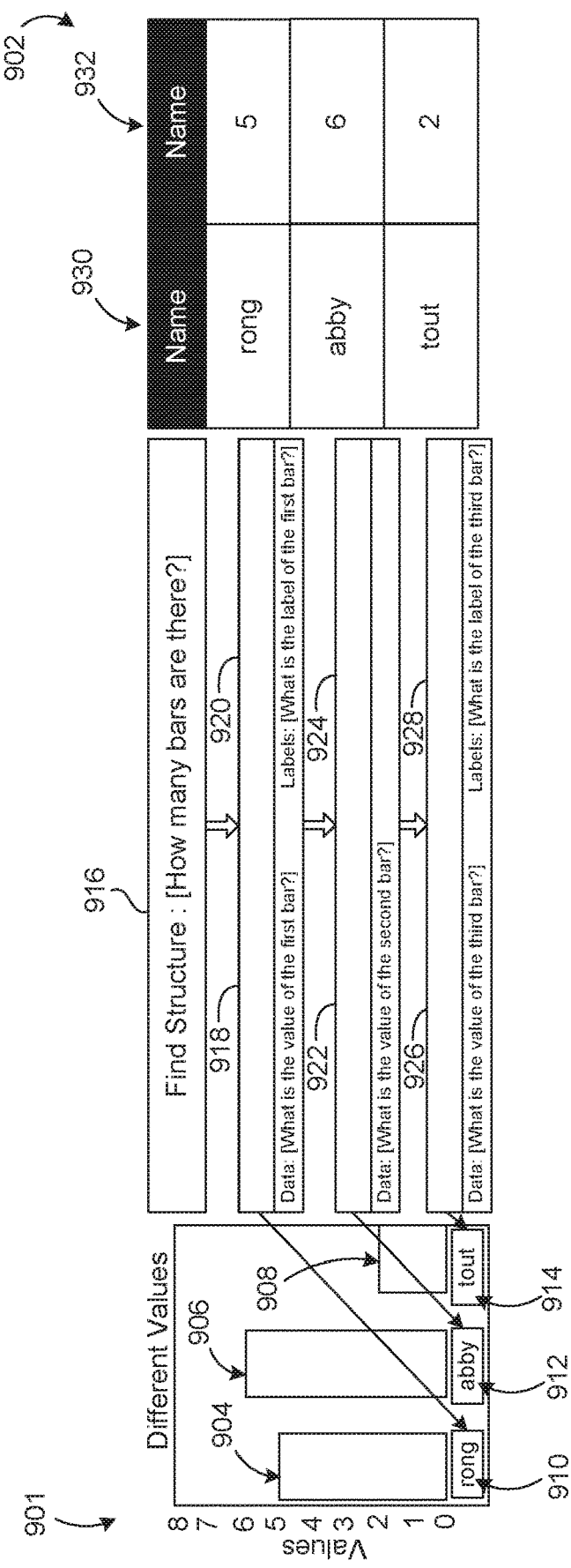
FIG. 9 is a flowchart and associated screenshots illustrating techniques for re-capturing data of a data visualization, using the systems of FIGS. 1-5.

FIG. 9 illustrates an example implementation of the source data generator 160, and associated source data queries 164 and source data 166, of FIG. 1. As already described with respect thereto, the system 100 of FIG. 1 may be configured to analyze a data visualization 901, and recover underlying data thereof (illustrated in FIG. 9 as source data 902), using the pre-structured source data queries 164. Specifically, as shown, the illustrated data visualization 901 includes a bar graph in which bars 904, 906, 908 are respectively associated with labels 910, 912, and 914. In response to a request for the source data 902, queries of the source data queries 164 may be applied. For example, the source data queries may include structural queries (916), such as how many bars are there? Of course, as already described, such structural questions may be determined based on irrelevance thereof to the type of the data visualization 901 being considered. For example, a similar question in the context of pie charts might include, "how many slices are included?"

Subsequently, various appropriate value and label questions may be applied. For example, having determined that three bars are present as a result of the structured-related queries of the operation 916, a pair of value and label questions may be applied for each of the identified bars. For example, a value question 918 of "what is the value of the first bar?" may be applied to the first bar, while a label question 920, "what is the label of the first bar?", may be applied. A similar value question 922 and label question 924 may be applied to the second bar, while a final value question 926 and label question 928 may be applied to the third bar. Thus, it may be observed that the source data generator 160 may be configured to utilize information determined from the one or more structure questions 916 to thereafter proceed to capture necessary value and label content.

As a result, in FIG. 9, the source data 902 may be constructed, including constructing a table of data in which the various labels 910, 912, 914 are included in corresponding rows of a name column 930. Similarly, values of the bars 904, 906, 908 are included in appropriate ones of the same rows, within a value column 932. Consequently, as already described above, the resulting source data 902 may thus be used for any desired or suitable purpose associated with formatted tables of data, including, e.g., performing data analysis, text searches, and generation of any specific data visualization.

Thus, the systems and methods of FIGS. 1-9 are not required to identify and classify visual elements with output answers; e.g., are not required to classify the top/best "K" answers within a set of pre-determined answers. Instead, the systems and methods of FIGS. 1-9 are configured to solve the problem of a label that does not have a static meaning, but rather has a local meaning that is potentially only valid in the context of a particular data visualization. Using the described techniques, the location of the label or other answer may be found, and ultimately interpreted, in the context of the entire, particular data visualization being examined. These and other features are obtained, even though the types of data visualizations being considered contain sparse image data that can not typically be examined using known types of natural image processing, which rely on statistically meaningful patterns that occur naturally in photographs (e.g., the likelihood that the sky will contain the sun or moon, or that an image of a car is likely to include an image of a road, but unlikely to include an image of a whale).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   identify a data visualization (DV);

generate a DV feature map characterizing the data visualization, including maintaining a correspondence of spatial relationships of mapped features of the data visualization within the DV feature map with corresponding features of the data visualization, wherein each location of the DV feature map represents a DV feature vector representing a corresponding location of the data visualization;

identify a query for an answer included within the data visualization;

encode the query as a query feature vector;

generate an attention map, using an attention weight distribution of attention weights distributed over the DV feature map with weight values that are set based on a relevance of the query feature vector to each attention weight and corresponding DV feature vector of the DV feature map;

generate an attention-weighted feature map that includes an array of weighted DV feature vectors, including multiplying each attention weight value of the attention weight distribution with the corresponding DV feature vectors of the DV feature map, including the DV feature vector;

generate a prediction of at least one answer location within the data visualization, based on the attention-weighted feature map; and determine the answer from the at least one answer location.

2. The computer program product of claim 1, wherein the instructions, when executed, are further configured to cause the at least one computing device to:

identify the data visualization included within an image file during a computer-based search of at least one document with at least one embedded image file, including the image file.

3. The computer program product of claim 1, wherein the data visualization includes at least one visual element and associated value and label that are arranged visually to represent, and are generated from, source data.

4. The computer program product of claim 1, wherein the instructions, when executed to generate the DV feature map, are further configured to cause the at least one computing device to:

input an image file containing the data visualization to a convolutional neural network trained using a dataset of data visualizations and associated query/answer pairs.

5. The computer program product of claim 1, wherein the instructions, when executed to encode the query, are further configured to cause the at least one computing device to:

input the query to a long short term memory model trained using a dataset of query/answer pairs.

6. The computer program product of claim 1, wherein the instructions, when executed to generate the attention map, are further configured to cause the at least one computing device to:

generate a composite DV feature vector from the array of weighted DV feature vectors;

concatenate the composite DV feature vector with the query feature vector to obtain a joint query/answer feature vector; and determine the answer location from the joint query/answer feature vector.

7. The computer program product of claim 1, wherein the instructions, when executed to determine the answer, are further configured to cause the at least one computing device to:

execute optical character recognition (OCR) within the at least one answer location to provide the answer as answer text.

8. The computer program product of claim 1, wherein the instructions, when executed to determine the answer, are further configured to cause the at least one computing device to:

apply a set of source data queries against the DV feature map, including the at least one query; and generate source data from which the data visualization was created, based on answers obtained from the applying of the source data queries.

9. The computer program product of claim 8, wherein the instructions, when executed to determine the answer, are further configured to cause the at least one computing device to:

generate a new data visualization, based on the generated source data.

10. The computer program product of claim 1, wherein the instructions, when executed to determine the answer, are further configured to cause the at least one computing device to:

render an overlaid image within a rendering of the data visualization and positioned to visually identify the answer at the answer location.

11. A computer-implemented method, the method comprising:

receiving a query for a data visualization (DV);

encoding the query as a query feature vector;

generating a DV feature map characterizing at least one spatial region of the data visualization, the DV feature map including an array of DV feature vectors corresponding to each of a plurality of locations within the at least one spatial region, wherein each location of the DV feature map represents a DV feature vector representing a corresponding location of the data visualization;

generating an attention map including applying a weighted distribution of attention weights to the DV feature vectors, in which, for each DV feature vector, a corresponding location of the plurality of locations is associated with a weight indicating a relative likelihood of inclusion of the answer;

generating an attention-weighted feature map that includes an array of weighted DV feature vectors, including multiplying each attention weight value of the attention weight distribution with the corresponding DV feature vectors of the DV feature map, including the DV feature vector;

generating a prediction of at least one answer location within the at least one spatial region, based on the attention-weighted feature map; and determining an answer to the query from the at least one answer location.

12. The method of claim 11, comprising:

inputting an image file containing the data visualization to a convolutional neural network trained using a dataset of data visualizations and associated query/answer pairs; and inputting the query to a long short term memory model trained using a dataset of query/answer pairs.

13. The method of claim 11, comprising:

executing optical character recognition (OCR) within the at least one answer location to provide the answer as answer text.

14. A system comprising:

at least one memory including instructions; and at least one processor that is operably coupled to the at least one memory and that is arranged and configured to execute instructions that, when executed, cause the at least one processor to:

generate a visualization training dataset that includes a plurality of training data visualizations and visualization parameters, and query/answer pairs for the plurality of training data visualizations;

train a feature map generator to generate a feature map of each of the training data visualizations;

train a query feature vector generator to generate a query feature vector of each of the queries of the query/answer pairs;

train an answer location generator to generate an answer location within each of the training data visualizations of an answer for a corresponding query of the query/answer pairs, based on outputs of the trained feature map generator and the trained query feature vector;

input a new data visualization and a new query into the trained feature map generator and the trained query feature vector to obtain a new feature map and a new query feature vector; and generate a new answer location within the new data visualization for the new query, based on the new feature map and the new query feature vector, wherein the answer location generator includes an attention map that assigns to each feature map of each of the training data visualizations a plurality of attention weights, each attention weight assigned to a spatial location of a corresponding feature map and indicating a relative likelihood that each spatial location includes the answer location, further wherein the answer location generator is configured to use the attention map and the plurality of attention weights to generate an attention-weighted feature map, which includes an array of weighted feature vectors having weights set by the plurality of attention weights, including multiplying each attention weight with corresponding feature vectors of the feature map.

15. The system of claim 14, wherein the system is further configured to:

generate the visualization training dataset synthetically.

16. The system of claim 14, wherein the system is further configured to:

apply a set of source data queries against the new feature map; and generate source data from which the data visualization was created, based on answers obtained from the applying of the source data queries.

* * * * *